US012812558B2

(12) United States Patent
Raghavan

(10) Patent No.: US 12,812,558 B2
(45) Date of Patent: Nov. 24, 2026

(54) METHODS FOR "NO TRANSMIT ZONE" INDICATION FOR UAVs

(71) Applicant: QUALCOMM Incorporated, San Diego, CA (US)

(72) Inventor: Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 18/590,843

(22) Filed: Feb. 28, 2024

(65) Prior Publication Data

US 2025/0274875 A1 Aug. 28, 2025

(51) Int. Cl.
*H04W 52/28* (2009.01)
*H04W 52/36* (2009.01)

(52) U.S. Cl.
CPC ....... *H04W 52/283* (2013.01); *H04W 52/367* (2013.01)

(58) Field of Classification Search
CPC .......................... H04W 52/283; H04W 52/367
See application file for complete search history.

(56) References Cited

U.S. PATENT DOCUMENTS

2022/0416860 A1* 12/2022 Hochdorf ............. H04B 7/0602
2024/0007180 A1 1/2024 Raghavan et al.
2026/0046821 A1* 2/2026 Kazmi .................... H04W 4/02

FOREIGN PATENT DOCUMENTS

WO 2024033432 A1 2/2024

OTHER PUBLICATIONS

3GPP: "3rd Generation Partnership Project, Technical Specification Group Services and System Aspects; Application layer support for Uncrewed Aerial System (UAS), Functional architecture and information flows, (Release 18)", 3GPP Standard, Technical Specification, 3GPP TS 23.255, 3rd Generation Partnership Project, Mobile Competence Centre, 650, Route Des Lucioles, F-06921 Sophia-Antipolis Cedex, France, No. V18.1.0, Mar. 31, 2023, pp. 1-79, XP052284115, The Whole Document.
International Search Report and Written Opinion—PCT/US2025/013212—ISA/EPO—Jan. 29, 2026.

* cited by examiner

*Primary Examiner* — Justin Y Lee
(74) *Attorney, Agent, or Firm* — Procopio, Cory, Hargreaves & Savitch LLP

(57) ABSTRACT

The apparatus may be a UAV or drone configured to receive a first indication of an NTZ associated with at least a first threshold for a transmission power for UAVs within the NTZ during a first period of time, enter the NTZ, and limit, within the NTZ, the transmission power associated with a transmission from the UAV to meet the first threshold. In an aspect of the disclosure, a method, a computer-readable medium, and an apparatus are provided. The apparatus may be a network device configured to output a first indication of an NTZ associated with at least a first threshold for a transmission power for UAVs within the NTZ during a first period of time and receive, based on the UAV being in the NTZ and with a power based on the first indication, a transmission from the UAV.

20 Claims, 13 Drawing Sheets

METHODS FOR "NO TRANSMIT ZONE" INDICATION FOR UAVs

TECHNICAL FIELD

The present disclosure relates generally to communication systems, and more particularly, to a no-transmit zone (NTZ) for aerial user equipments (UEs) such as unmanned/uncrewed aerial vehicles (UAVs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an aerial user equipment (UE), unmanned aerial vehicle (UAV), a non-terrestrial UE, or drone configured to receive a first indication of a NTZ associated with at least a first threshold for a transmission power for UAVs within the NTZ during a first period of time, enter the NTZ, and limit, within the NTZ, the transmission power associated with a transmission from the UAV to meet the first threshold.

In an aspect of the disclosure, a method, a computer-readable medium, and an apparatus are provided. The apparatus may be a network device configured to output a first indication of an NTZ associated with at least a first threshold for a transmission power for UAVs within the NTZ during a first period of time and receive, based on the UAV being in the NTZ and with a power based on the first indication, a transmission from the UAV.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
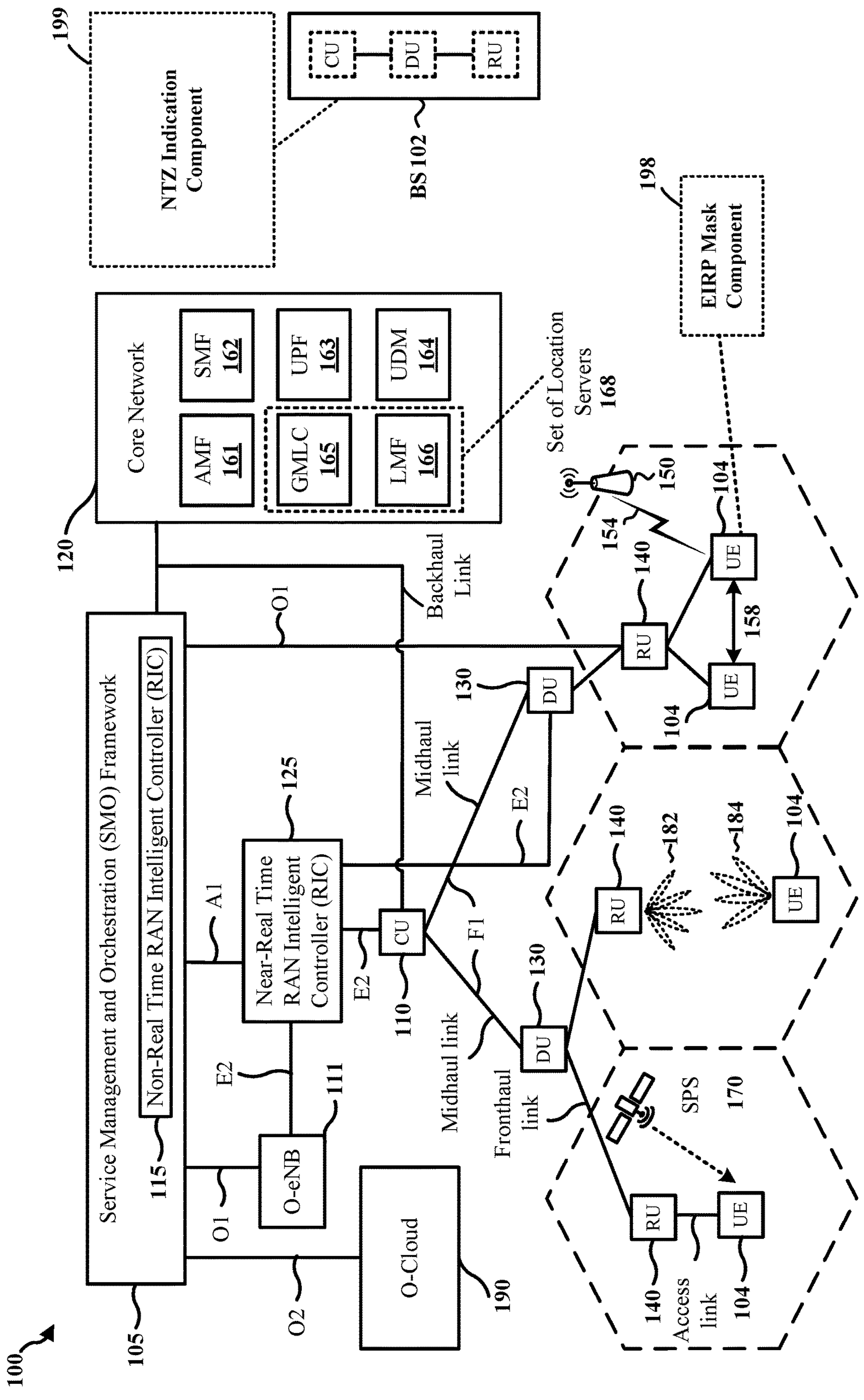
FIG. 1 is a diagram illustrating an example of a wireless communications system and an access network.

In some aspects of wireless communication, an aerial UE, such as a UAV (e.g., a drone or a non-terrestrial UE), may communicate with a base station or UAV controller. In some situations, limitations may be placed on a power associated with wireless communication by such aerial UEs. In some aspects, the limitations may be in place for particular areas and/or for particular directions (or angles).

Various aspects relate generally to meeting regulatory requirements applied to UAVs while enabling wireless communication from the UAVs (where the term UAV may be used herein to refer to drones and/or non-terrestrial UEs). For example, a UAV may not be allowed to transmit signals with a power higher than a specified power (e.g., EIRP over a specific angle corresponding to azimuth and/or elevation) in a particular band if the UAV is within an NTZ. In a situation where a UAV is in the vicinity of the NTZ, the UAV may provide an indication to the serving base station informing the base station that the UAV is in an area with transmission limitations for the current serving band. The UAV may provide an indication about a switch to another frequency band. Some aspects more specifically relate to (1) the introduction of an "additional area of uncertainty" around the NTZ such that, when a UAV enters the additional area of uncertainty, the UAV provides an indication to a base station and/or network that the UAV is in the vicinity of the NTZ and (2) an indication of a switch in UL transmissions to another band to avoid transmissions in the NTZ in the regulated and/or restricted frequency range. In some examples, a UAV, a drone, or an aerial UE may be configured to receive a first indication of an NTZ associated with at least a first threshold for a transmission power for UAVs within the NTZ during a first period of time, enter the NTZ, and limit, within the NTZ, the transmission power associated with a transmission from the UAV to meet the first threshold. Similarly, a network device may be configured to output a first indication of an NTZ associated with at least a first threshold for a transmission power for UAVs within the NTZ during a first period of time and receive, based on the UAV being in the NTZ and with a power based on the first indication, a transmission from the UAV.

Particular aspects of the subject matter described in this disclosure can be implemented to realize one or more of the following potential advantages. In some examples, by introducing an EIRP mask for transmissions within an NTZ, the described techniques can be used to allow UAV-related communication while minimizing interference with network elements protected by the NTZ.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (Dus), or one or more radio units (Rus)). In some aspects, a CU may be implemented within a RAN node, and one or more Dus may be co-located with the CU, or alternatively, may be geographically or virtually distributed throughout one or multiple other RAN nodes. The Dus may be implemented to communicate with one or more Rus. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (Pcell) and a secondary component carrier may be referred to as a secondary cell (Scell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (e.g., an aerial UE such as a UAV) may have an EIRP mask component 198 that may be configured to receive a first indication of an NTZ associated with at least a first threshold for a transmission power for UAVs within the NTZ during a first period of time, enter the NTZ, and limit, within the NTZ, the transmission power associated with a transmission from the UAV to meet the first threshold. In certain aspects, the base station 102 may have an NTZ indication component 199 that may be configured to output a first indication of an NTZ associated with at least a first threshold for a transmission power for UAVs (e.g., or other aerial UEs) within the NTZ during a first period of time and receive, based on the UAV being in the NTZ and with a power based on the first indication, a transmission from the UAV. Although the following description may be focused on 5G NR, the concepts described herein may be applicable to other similar areas, such as LTE, LTE-A, CDMA, GSM, and other wireless technologies.

Figures 2A, 2B, 2C, 2D:
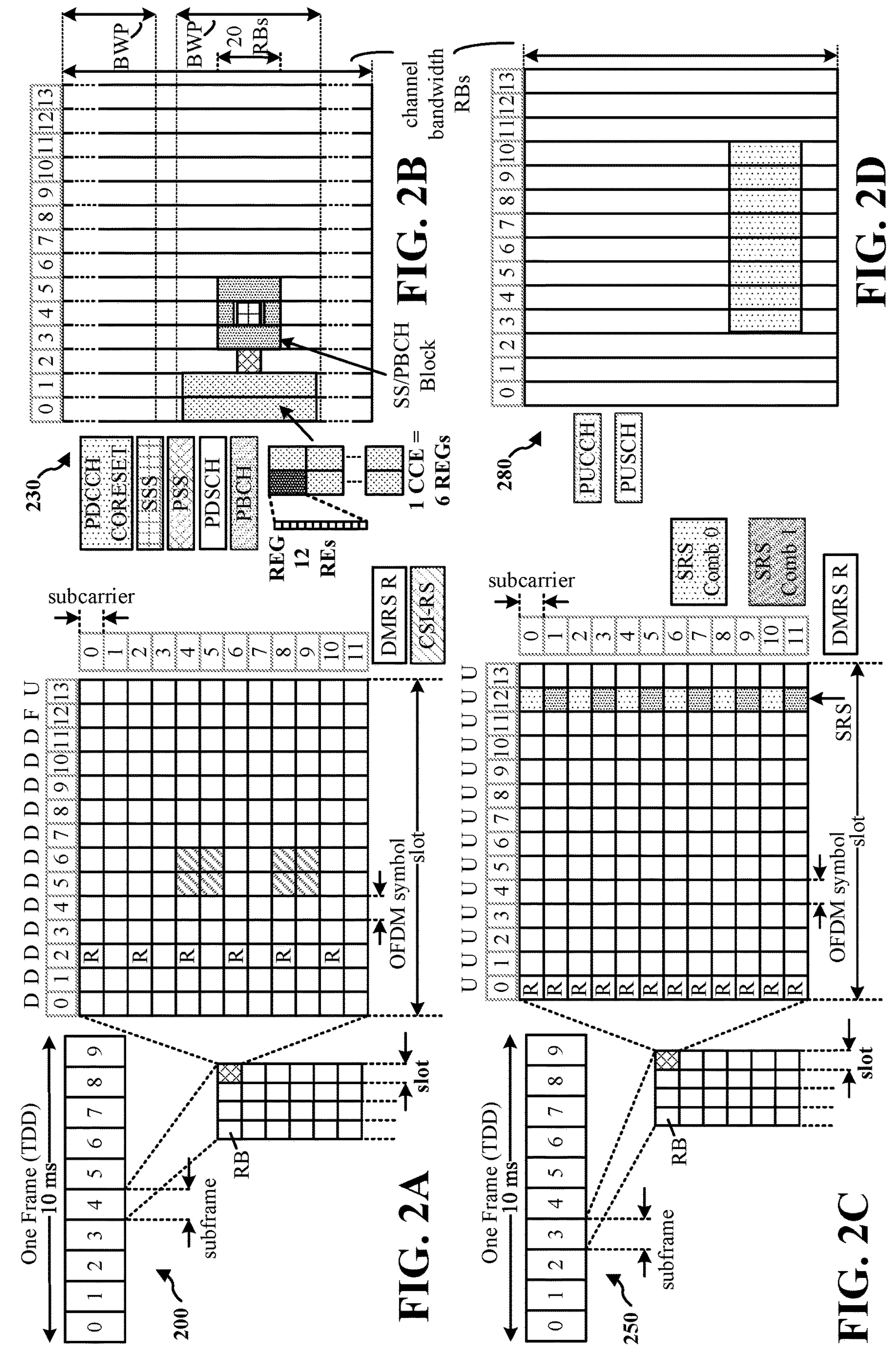
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (Res). The number of bits carried by each RE depends on the modulation scheme.

As illustrated in FIG. 2A, some of the Res carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive Res in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the Res carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
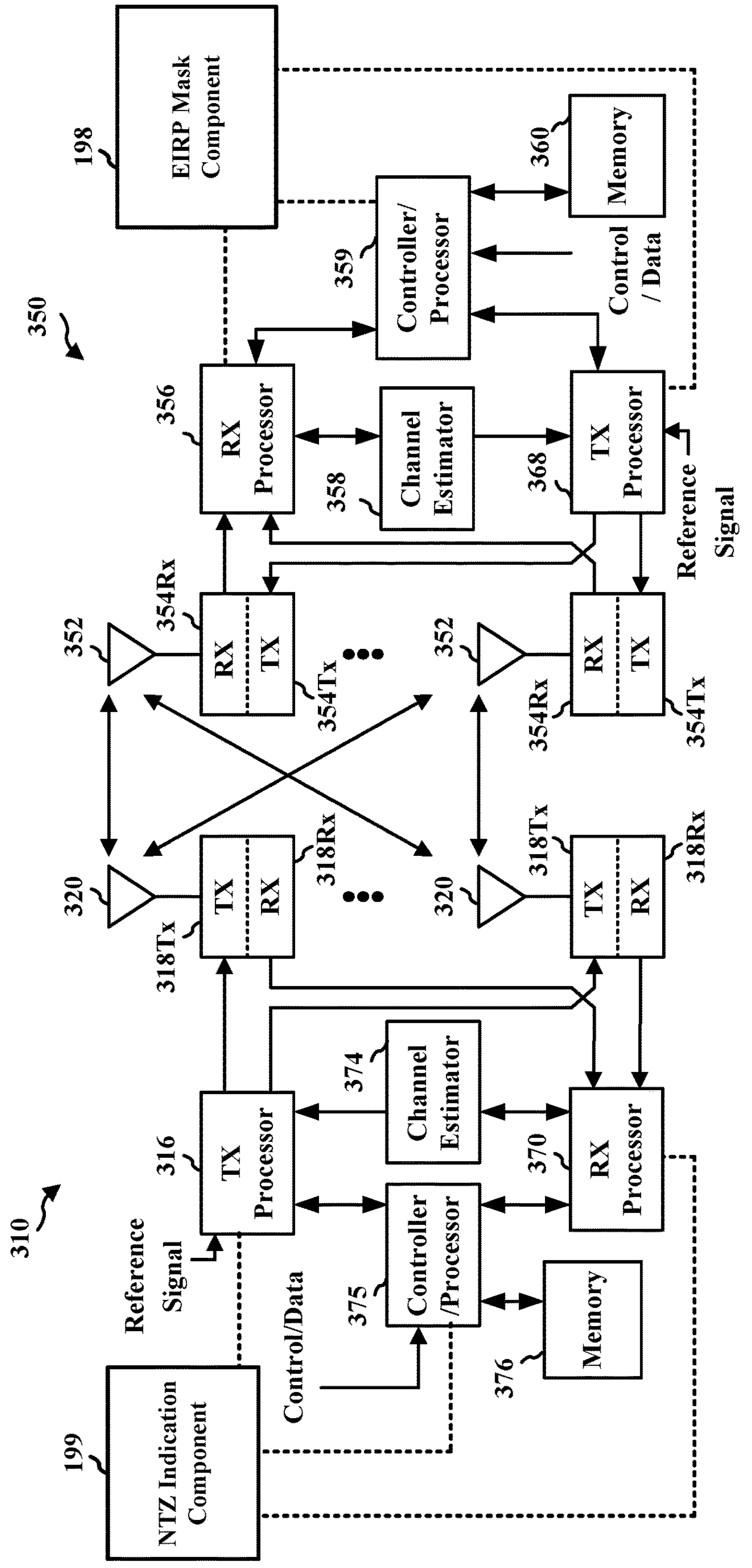
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the EIRP mask component 198 of FIG. 1.

At least one of the TX processor 316, the RX processor 370, and the controller/processor 375 may be configured to perform aspects in connection with the NTZ indication component 199 of FIG. 1.

Figure 4A:
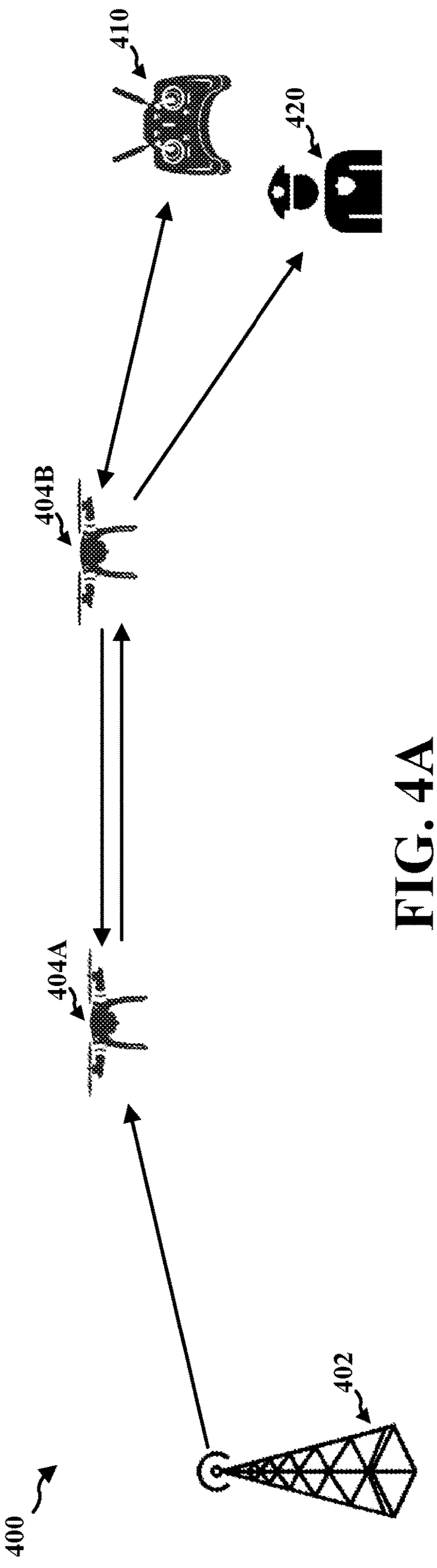
FIG. 4A is a diagram illustrating aspects of wireless communication with UAVs in accordance with some aspects of the disclosure.
Figure 4B:
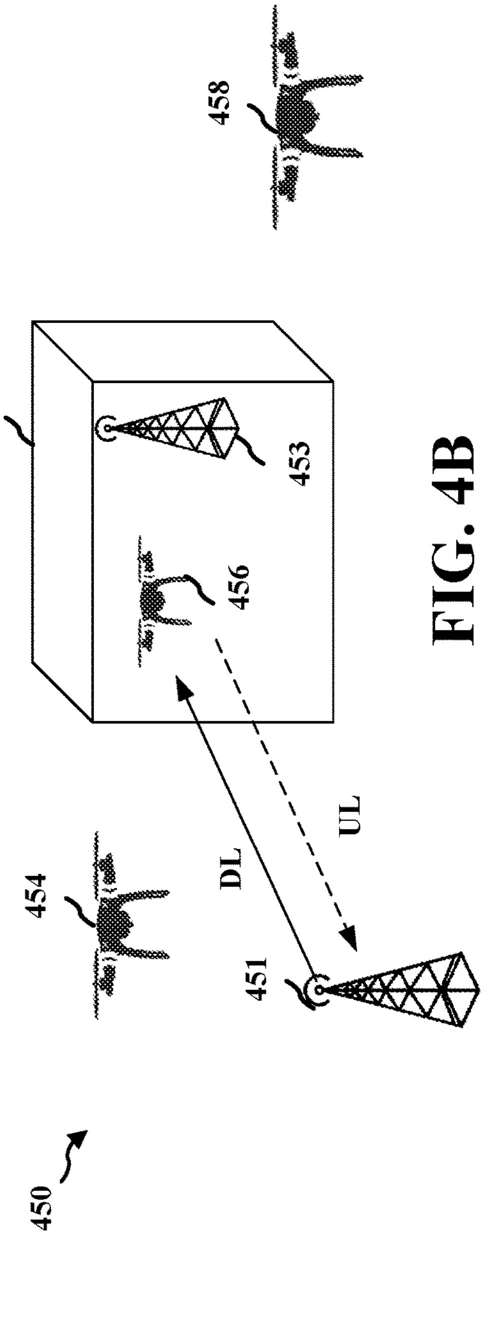
FIG. 4B is a diagram illustrating aspects of NTZ in accordance with some aspects of the disclosure.

Wireless communication system may support various types of wireless traffic and/or various types of UEs. As an example, aerial UEs (such as UAVs, drones, or other types of aerial UEs) may transmit and receive wireless communication. FIG. 4A is a diagram 400 illustrating aspects of wireless communication with UAVs in accordance with some aspects of the disclosure. Diagram 400 illustrates a base station 402, a first UAV 404A, a second UAV 404B, a UAV controller 410, and a UAV authority 420 in communication. Although the example is presented for UAVs as examples of aerial UEs, the concepts may be similarly applied for other aerial UEs. As illustrated in diagram 400, there may be communication between the base station 402 and the first UAV 404A (e.g., as an example of a communication between a network and/or network device and a drone, UAV, or other similar UE). Similarly, there may be unidirectional and/or bidirectional communication between the first UAV 404A and the second UAV 404B, for example, a broadcast (over PC5) for collision avoidance (e.g., U2X detect and avoid (U2X-DAA)). In some aspects, a UAV controller 410 may operate in a beyond visual line of sight (BVLOS) mode of operation associated with bi-directional communication between the UAV controller 410 and a UAV (e.g., the second UAV 404B). Additionally, in some aspects, a UAV authority may receive (e.g., via a PC5 broadcast) UAV identification (e.g., a UAV ID) or UAV flight information. In some aspects, the UAV authority may transmit (e.g., via broadcast, multicast, or unicast) configurations associated with regulatory requirements. In some situations, the regulatory requirements may include limitations placed on a power associated with wireless communication. In some aspects, the limitations may be in place for particular areas and/or for particular directions (or angles). FIG. 4B is a diagram 450 illustrating example aspects of an NTZ that may be associated with restrictions for aerial UEs. In some aspects, there may be restrictions or limits on an aerial UE entering the zone/region. For example, the area may be referred to as a no fly zone. For example, the aerial UE 456 might be restricted from entering the zone labeled as 452. In some aspects, there may be limitations or restrictions on transmissions by aerial UEs within the zone, and the zone may be referred to as an NTZ. FIG. 4B illustrates a base station 451 serving an aerial UE 456 that is inside of an NTZ 452. For example, the serving base station 451 may transmit downlink transmissions to the aerial UE 456, yet the aerial UE 456 might be restricted from transmitting uplink transmissions or may have a transmission power limit on uplink transmissions based on the UE's location within the NTZ 452. The limitations on the uplink transmission may help to avoid or reduce interference to a network node 453, or base station, within the NTZ 452. Other aerial UEs, e.g., 454 and 458, that are located outside of the NTZ 452 may transmit without the limitations associated with the NTZ.

For example, the limitations associated with the NTZ 452 may include restrictions similar to limitations for terrestrial networks to avoid interference with air-to-ground (ATG) networks (e.g., to minimize interference from a base station toward the sky). In some aspects, the limitations associated with the NTZ 452 may include restrictions for transmission via certain frequency ranges, such as to avoid interference with airplane radio altimeters operating in the 4.2-4.4 GHz range. In some aspects, the limitations associated with the NTZ 452 may include restrictions for spectrum sharing between terrestrial and satellite services. For example, intermediate frequencies (e.g., FR3 between 7.125-24.25 GHz may be subject to spectrum sharing between terrestrial and satellite services. In some aspects, the limitations associated with the NTZ 452 may include restrictions for millimeter wave carrier frequencies that use large antenna arrays (e.g., using ≥64 antenna elements) to mitigate interference with transmissions using frequency range designation FR3 (7.125 GHZ-24.25 GHz). The limitations, in some aspects, may be associated with an effective isotropic radiated power (EIRP) mask and/or threshold. In some aspects. EIRP may be referred to as an equivalent isotropic radiated power. In some aspects, an EIRP mask provides a maximum/average permissible EIRP level over a specific angle (typically elevation) and an aggressor node is expected to transmit within the prescribed specifications such that, when the transmission power is below the specifications, "victim" nodes (e.g., base stations or other wireless devices being protected from interference) experience minimized interference from "aggressor" nodes (e.g., nodes producing the interfering transmissions). For example, an average EIRP for a particular angle ($\theta_0$) may be defined and/or specified as $$EIRP_{avg}(\theta_0) = \frac{1}{NK}\sum_{k=1}^{K}\sum_{n=1}^{N}\omega_{n,k}\cdot P(\theta_0, \Phi_n, w_k)$$

while a maximum EIRP for the particular angle ($\theta_0$) may be defined and/or specified as $$EIRP_{max}(\theta_0) = \max_{k=1,\ldots,K}\max_{n=1,\ldots,N}\omega_{n,k}.$$

$P(\theta_0, \Phi_n, w_k)$. In this example, $\theta_0$ represents an elevation angle of interest, $\Phi_n$ represents the azimuth angle, and $w_k$ represents the beamforming vector used by a node (e.g., an aggressor node, a UAV, among other examples). The averaging metric (e.g., $EIRP_{avg}$) takes a weighted average of the EIRP (e.g., represented by the metric $P(\theta_0, \Phi_n, w_k)$) over N choices of azimuth angles and K choices of beamforming vectors, e.g., as weighted by a weighting factor ω. The maximum metric (e.g., $EIRP_{max}$) may be referred to as a worst case EIRP over the set of choices (e.g., possible choices of azimuth angles and beamforming vectors).

Figure 5:
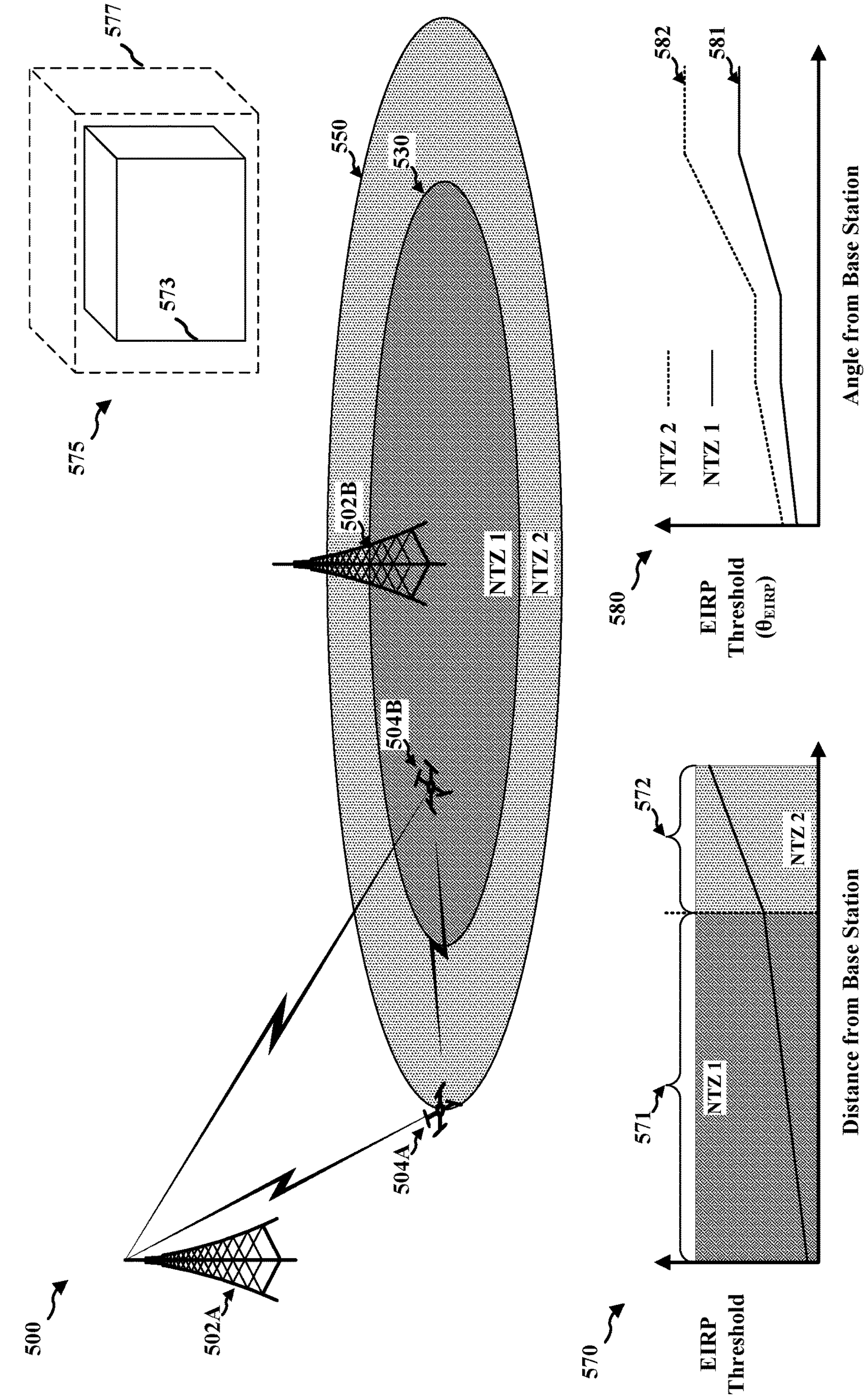
FIG. 5 is a diagram illustrating a set of base stations and UAVs in an environment including two NTZs in accordance with some aspects of the disclosure.

FIG. 5 is a diagram 500 illustrating a set of base stations and UAVs in an environment including one or more NTZs in accordance with some aspects of the disclosure. Diagram 500 illustrates that a first UAV 504A and a second UAV 504B may communicate with a first base station 502A outside a first NTZ 530 and a second NTZ 550 centered around a second base station 502B. In some aspects, the UAVs may transmit and receive communication with each other, e.g., over a PC5 interface or based on sidelink. In some aspects, the first NTZ 530 and the second NTZ may be centered on something other than a base station, such as an airport, a sporting event, or other event for which a permanent, temporary, and/or dynamic NTZ may be provided. The first NTZ 530, in some aspects, may be associated with an EIRP mask or other maximum and/or average transmission power threshold to protect the second base station 502B from (UAV-based) interference.

The second NTZ 550, in some aspects, may be an area associated with and extending beyond the first NTZ 530 that is associated with transmitting, from a UAV entering the second NTZ 550 (e.g., the first UAV 504A), an indication that the UAV is entering the second NTZ 550. In some aspects, the second NTZ 550 may further be associated with an additional EIRP mask or other maximum and/or average transmission power threshold to protect the second base station 502B from (UAV-based) interference. The additional or other maximum and/or average transmission power threshold may be associated with a higher EIRP, maximum, and/or average power than the EIRP mask or other maximum and/or average transmission power threshold associated with the first NTZ 530 as it is farther from the base station 502B (or other area or network device to be protected from UAV-based interference).

Diagram 570 and diagram 580 illustrate EIRP masks based on distance from the base station 502B and based on an angle from the base station 502B (where an angle of "0" may be defined as being along the axis between the UAV and the base station 502B), respectively. For example, for a distance-based EIRP mask, the first NTZ 530 may be associated with a first portion of the EIRP mask 571 and the second NTZ 550 may be associated with a second portion of the EIRP mask 572. For an angle-based EIRP mask, for example, the first NTZ 530 may be associated with a first EIRP mask 581 and the second NTZ 550 may be associated with a second EIRP mask 582.

Various aspects relate generally to meeting regulatory requirements applied to UAVs. For example, a UAV may not be allowed to transmit signals with power higher than a specified power (e.g., EIRP over a specific angle) in a particular band if the UAV is within an NTZ. In a situation where a UAV is in the vicinity of the NTZ, the UAV may need to provide an indication to the serving gNB that it is in an area where the current serving band needs to be switched to another band. For example, an "additional area of uncertainty" may be provided around the NTZ such that, when a UAV enters the additional area of uncertainty, the UAV provides an indication to a base station and/or network that the UAV is in the vicinity of the NTZ. In some aspects, the area shown as 550 surrounding NTZ 1 530 may represent the area of uncertainty, and if the UAV enters the area, the UAV may transmit an indication of its presence near the NTZ 1. For example, if the NTZ 2 corresponds to an area of uncertainty, there may or may not be a limit on the UAV's transmissions within the NTZ 2. For example, instead of limiting its transmissions based on a location within the NTZ 2, a UAV may be triggered, based on presence in the NTZ 2, to notify the network of its location near the NTZ 1. At 575, a three dimensional area of uncertainty 577 is illustrated that may surround an NTZ 573, as another example of a zone, or region, in which an UAV may be triggered to provide an indication of its presence near an NTZ. In some aspects, the UAV may provide an indication of a switch in UL transmissions to another band to avoid transmissions in the NTZ in the regulated and/or restricted frequency range. In some examples, a UAV and/or drone may be configured to receive a first indication of an NTZ associated with at least a first threshold for a transmission power for UAVs within the NTZ during a first period of time, enter the NTZ, and limit, within the NTZ, the transmission power associated with a transmission from the UAV to meet the first threshold. Similarly, a network device may be configured to output a first indication of an NTZ associated with at least a first threshold for a transmission power for UAVs within the NTZ during a first period of time and receive, based on the UAV being in the NTZ and with a power based on the first indication, a transmission from the UAV.

Particular aspects of the subject matter described in this disclosure can be implemented to realize one or more of the following potential advantages. In some examples, by introducing an EIRP mask for transmissions within an NTZ, the described techniques can be used to allow UAV-related communication while minimizing interference with network elements protected by the NTZ.

Figure 6:
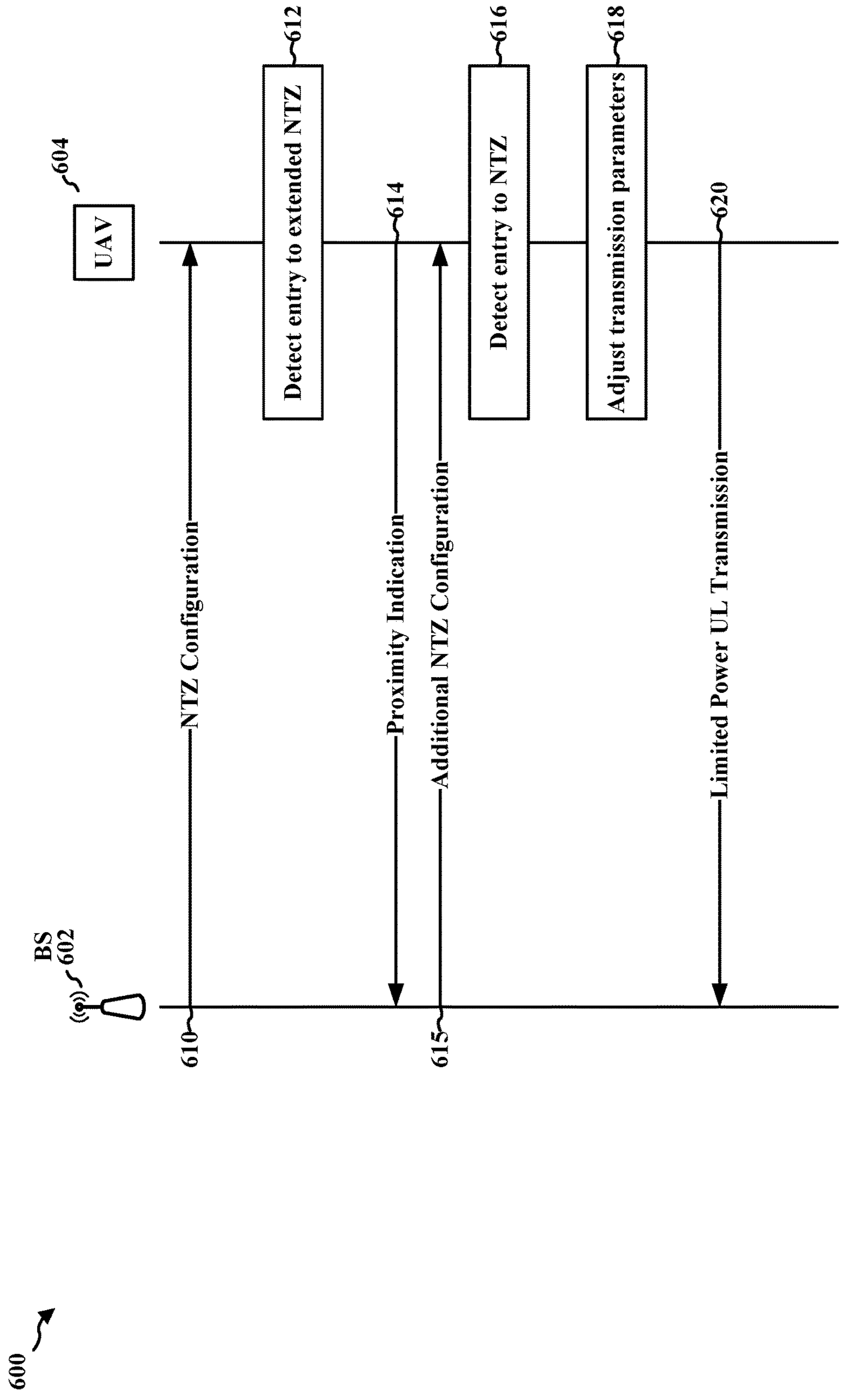
FIG. 6 is a call flow diagram illustrating a method in accordance with some aspects of the disclosure.

FIG. 6 is a call flow diagram 600 illustrating a method in accordance with some aspects of the disclosure. The method is illustrated in relation to a base station 602 (e.g., as an example of a network device or network node that may include one or more components of a disaggregated base station) in communication with a UAV 604 (e.g., as an example of a wireless device). The functions ascribed to the base station 602, in some aspects, may be performed by one or more components of a network entity, a network node, or a network device (a single network entity/node/device or a disaggregated network entity/node/device as described above in relation to FIG. 1). Similarly, the functions ascribed to the UAV 604, in some aspects, may be performed by one or more components of a wireless device supporting communication with a network entity/node/device. Accordingly, references to "transmitting" in the description below may be understood to refer to a first component of the base station 602 (or the UAV 604) outputting (or providing) an indication of the content of the transmission to be transmitted by a different component of the base station 602 (or the UAV 604). Similarly, references to "receiving" in the description below may be understood to refer to a first component of the base station 602 (or the UAV 604) receiving a transmitted signal and outputting (or providing) the received signal (or information based on the received signal) to a different component of the base station 602 (or the UAV 604).

The base station 602 may transmit, and the UAV 604 may receive, NTZ configuration 610. The NTZ configuration 610, in some aspects, may include a first indication of an NTZ associated with at least a first threshold for a transmission power for UAVs within the NTZ during a first period of time. The transmission power, in some aspects, may be an EIRP. In some aspects, the EIRP may be one of a maximum EIRP or an average EIRP. The first threshold for the transmission power may be associated with a first frequency range. The first indication of the NTZ, in some aspects, may also indicate the time period associated with the first threshold. In some aspects, for example, the first indication may indicate a start and end time, a start time and duration, or a start time with an end to be indicated at a later time (e.g., indicated dynamically by another NTZ configuration indication) for an application of the first threshold. However, in some aspects, the first indication may be omitted until a triggering event.

The NTZ configuration 610, in some aspects, may include a second indication of the area associated with and extending beyond the NTZ (e.g., such as the example area of uncertainty described in connection with FIG. 5). The area associated with and extending beyond the NTZ, in some aspects, may be associated with one or more of a transmission of a proximity indication indicating that the UAV has entered the area associated with the NTZ and/or a second threshold for the transmission power for the UAVs within the area during the first period of time. In some aspects, the second threshold may be higher than the first threshold (e.g., as illustrated in diagram 570 and diagram 580 of FIG. 5).

After receiving the NTZ configuration 610, the UAV 604 may enter the area associated with and extending beyond the NTZ (or the extended NTZ). At 612, the UAV 604 may detect that the UAV 604 has entered the extended NTZ. Based on the NTZ configuration 610 and the detection of entering the extended NTZ at 612, the UAV 604 may transmit, and the base station 602 may receive a proximity indication 614. The proximity indication 614, in some aspects, may trigger the base station 602 to transmit an additional NTZ configuration 615 including the first indication of the NTZ associated with at least the first threshold for the transmission power for UAVs within the NTZ during the first period of time if not included in the NTZ configuration 610.

After receiving the first indication, whether in the NTZ configuration 610 or the additional NTZ configuration 615, the UAV 604 may enter the NTZ. The UAV 604, in some aspects, may detect, at 616, the entry to the NTZ. Based on entry to the NTZ, the UAV 604 may adjust, at 618, the transmission parameters. Adjusting the transmission power at 618, in some aspects, may include adjusting the power in accordance with an EIRP mask included in one of the NTZ configuration 610 or the additional NTZ configuration 615. In some aspects, adjusting the transmission power at 618, may include switching from transmitting via the first frequency range to transmitting via a second frequency range that is disjoint from the first frequency range in accordance with the first threshold indicated in one of the NTZ configuration 610 or the additional NTZ configuration 615.

The UAV 604, may then transmit, and the base station 602 may receive, a limited power UL transmission in accordance with the first threshold included in the NTZ configuration 610 and/or additional NTZ configuration 615.

Figure 7:
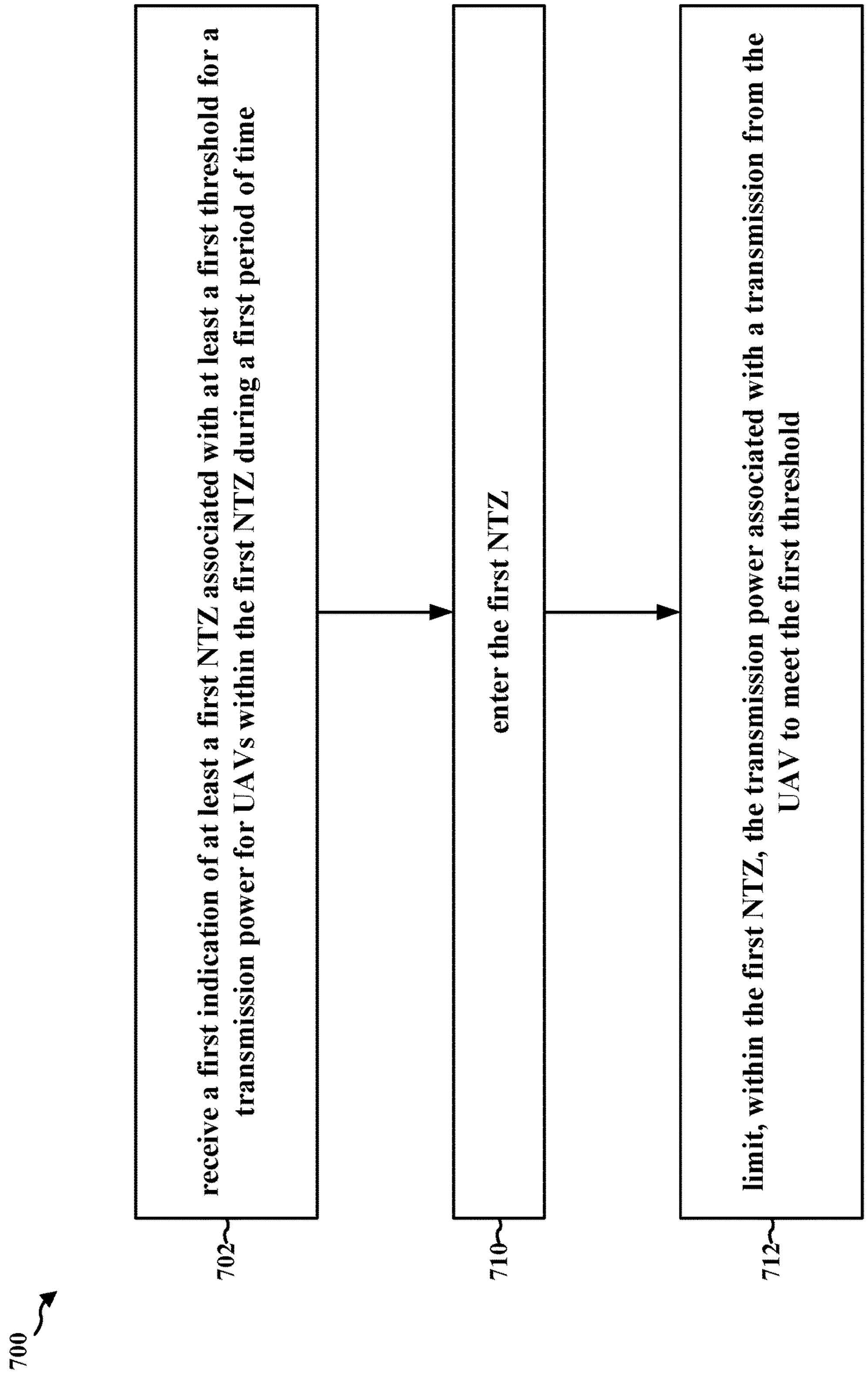
FIG. 7 is a flowchart of a method of wireless communication.

FIG. 7 is a flowchart 700 of a method of wireless communication. The method may be performed by a UE such as a UAV (e.g., the UE 104; the UAV 404A, 404B, 504A, 504B, 604; the apparatus 1104). At 702, the UAV may receive a first indication of an NTZ associated with at least a first threshold for a transmission power for UAVs within the NTZ during a first period of time. For example, 702 may be performed by application processor(s) 1106, cellular baseband processor(s) 1124, transceiver(s) 1122, antenna(s) 1180, and/or EIRP mask component 198 of FIG. 11. In some aspects, the transmission power is an EIRP. The first threshold, in some aspects, may be associated with one of a maximum EIRP or an average EIRP. In some aspects, the first threshold may be associated with a first frequency range. In some aspects, the UAV 604 may be configured with a set of class identifiers associated with a set of NTZ classes associated with different thresholds and/or EIRP masks to apply to transmissions. The first indication, in some aspects, may indicate, via a first class identifier, that the NTZ is a first class of NTZ in the set of NTZ class associated with the first threshold. The first indication of the NTZ, in some aspects, may also indicate the time period associated with the first threshold. In some aspects, for example, the first indication may indicate a start and end time, a start time and duration, or a start time with an end to be indicated at a later time (e.g., indicated dynamically by another NTZ configuration indication) for an application of the first threshold. For example, referring to FIG. 6, the UAV 604 may receive the NTZ configuration 610 (or the additional NTZ configuration 615) including the first indication of the NTZ.

In some aspects, the UAV may receive a second indication of an area associated with and extending beyond the NTZ. In some aspects, at least a portion of the area that extends beyond the NTZ may be associated with a second threshold for the transmission power for the UAVs within the area during the first period of time. The second threshold, in some aspects, may be higher than the first threshold. The area associated with and extending beyond the NTZ, in some aspects, may be associated with a transmission of a proximity indication indicating that the UAV has entered the area associated with the NTZ. For example, referring to FIG. 6, the UAV 604 may receive the NTZ configuration 610 including the second indication of the area associated with and extending beyond the NTZ.

In some aspects, the UAV may enter an area associated with and extending beyond the NTZ (e.g., an extended NTZ). In some aspects, entering the area includes determining that the UAV has entered the area. Referring, for example, to FIG. 6, the UAV 604 may enter the extended NTZ and may detect the entry to the extended NTZ at 612. In some aspects, the UAV may transmit, based on entering the area, a proximity indication indicating that the UAV has entered the area associated with the NTZ. In some aspects, if the first indication of the NTZ was not received at 702, the UAV may receive the first indication of the NTZ based on transmitting the proximity indication. For example, referring to FIG. 6, the UAV 604 may transmit the proximity indication 614 and may receive the additional NTZ configuration 615 including the first indication of the NTZ.

At 710, the UAV may enter the NTZ and, at 712, may limit, within the NTZ, the transmission power associated with a transmission from the UAV to meet the first threshold. In some aspects, limiting, within the NTZ, the transmission power associated with the transmission from the UAV to meet the first threshold at 712 may include switching, from transmitting via the first frequency range to transmitting via a second frequency range that is disjoint from the first frequency range. For example, 712 may be performed by application processor(s) 1106, cellular baseband processor(s) 1124, transceiver(s) 1122, antenna(s) 1180, and/or EIRP mask component 198 of FIG. 11. Referring, for example, to FIG. 6, the UAV 604 may enter the NTZ and may detect the entry to the extended NTZ at 616, adjust the transmission parameters at 618, and transmit the limited power UL transmission 620.

Figure 8:
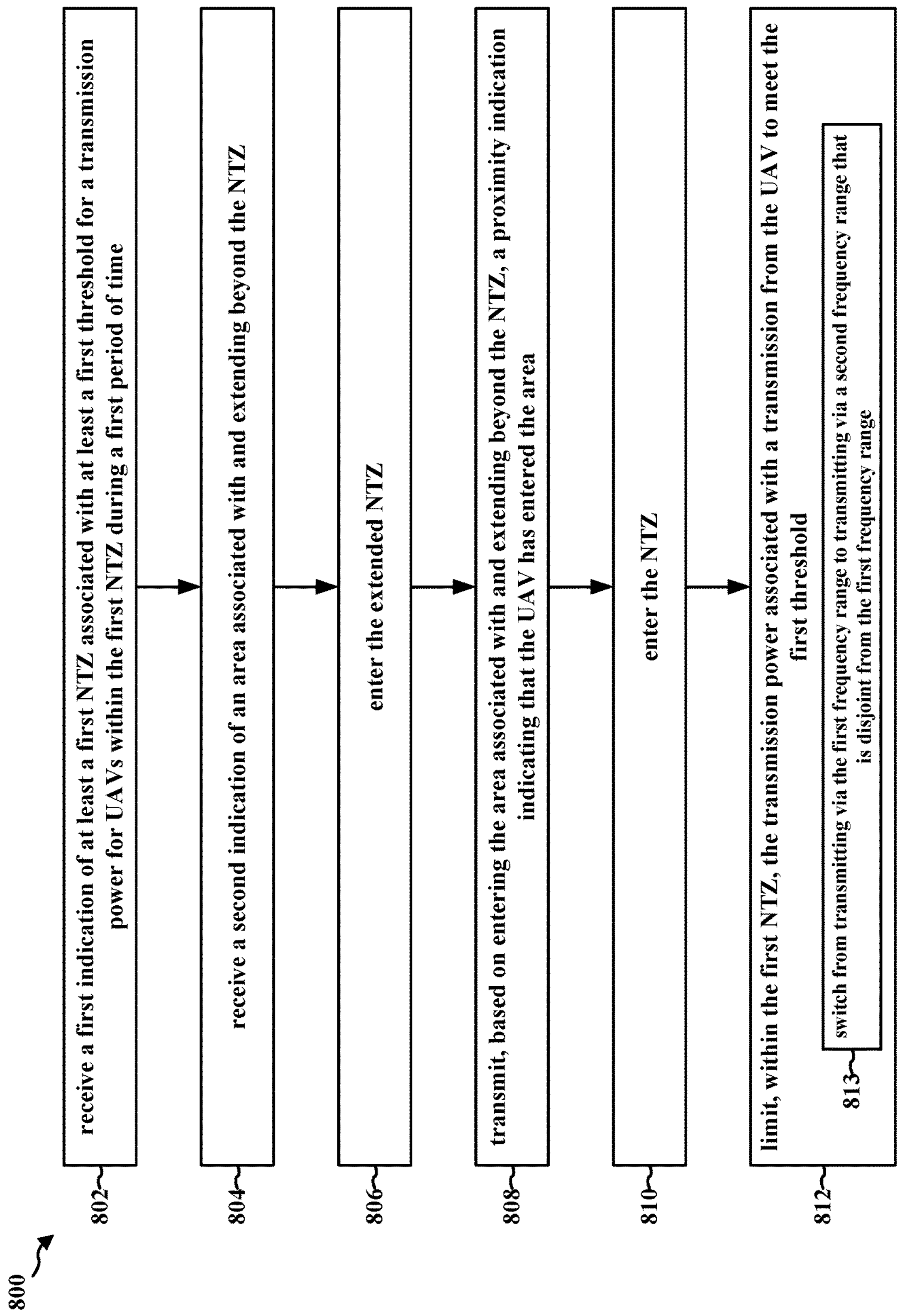
FIG. 8 is a flowchart of a method of wireless communication.

FIG. 8 is a flowchart 800 of a method of wireless communication. The method may be performed by a UE such as a UAV (e.g., the UE 104; the UAV 404A, 404B, 504A, 504B, 604; the apparatus 1104). At 802, the UAV may receive a first indication of an NTZ associated with at least a first threshold for a transmission power for UAVs within the NTZ during a first period of time. For example, 802 may be performed by application processor(s) 1106, cellular baseband processor(s) 1124, transceiver(s) 1122, antenna(s) 1180, and/or EIRP mask component 198 of FIG. 11. In some aspects, the transmission power is an EIRP. The first threshold, in some aspects, may be associated with one of a maximum EIRP or an average EIRP. In some aspects, the first threshold may be associated with a first frequency range. The first indication, in some aspects, may indicate that the NTZ is a first class of NTZ associated with the first threshold. The first indication of the NTZ, in some aspects, may also indicate the time period associated with the first threshold. In some aspects, for example, the first indication may indicate a start and end time, a start time and duration, or a start time with an end to be indicated at a later time (e.g., indicated dynamically by another NTZ configuration indication) for an application of the first threshold. For example, referring to FIG. 6, the UAV 604 may receive the NTZ configuration 610 (or the additional NTZ configuration 615) including the first indication of the NTZ.

At 804, the UAV may receive a second indication of an area associated with and extending beyond the NTZ. For example, 804 may be performed by application processor(s) 1106, cellular baseband processor(s) 1124, transceiver(s) 1122, antenna(s) 1180, and/or EIRP mask component 198 of FIG. 11. In some aspects, at least a portion of the area that extends beyond the NTZ may be associated with a second threshold for the transmission power for the UAVs within the area during the first period of time. The second threshold, in some aspects, may be higher than the first threshold. The area associated with and extending beyond the NTZ, in some aspects, may be associated with a transmission of a proximity indication indicating that the UAV has entered the area associated with the NTZ. For example, referring to FIG. 6, the UAV 604 may receive the NTZ configuration 610 including the second indication of the area associated with and extending beyond the NTZ.

At 806, the UAV may enter an area associated with and extending beyond the NTZ (e.g., an extended NTZ). In some aspects, entering the area includes determining that the UAV has entered the area. For example, 806 may be performed by application processor(s) 1106, cellular baseband processor(s) 1124, transceiver(s) 1122, antenna(s) 1180, and/or EIRP mask component 198 of FIG. 11. Referring, for example, to FIG. 6, the UAV 604 may enter the extended NTZ and may detect the entry to the extended NTZ at 612.

At 808, the UAV may transmit, based on entering the area, a proximity indication indicating that the UAV has entered the area associated with the NTZ. For example, 808 may be performed by application processor(s) 1106, cellular baseband processor(s) 1124, transceiver(s) 1122, antenna(s) 1180, and/or EIRP mask component 198 of FIG. 11. In some aspects, if the first indication of the NTZ was not received at 802, the UAV may receive the first indication of the NTZ based on transmitting the proximity indication. For example, referring to FIG. 6, the UAV 604 may transmit the proximity indication 614 and may receive the additional NTZ configuration 615 including the first indication of the NTZ.

At 810, the UAV may enter the NTZ and, at 812, may limit, within the NTZ, the transmission power associated with a transmission from the UAV to meet the first threshold. In some aspects, limiting, within the NTZ, the transmission power associated with the transmission from the UAV to meet the first threshold at 812 may include switching, at 813, from transmitting via the first frequency range to transmitting via a second frequency range that is disjoint from the first frequency range. For example, 812 and 813 may be performed by application processor(s) 1106, cellular baseband processor(s) 1124, transceiver(s) 1122, antenna(s) 1180, and/or EIRP mask component 198 of FIG. 11. Referring, for example, to FIG. 6, the UAV 604 may enter the NTZ and may detect the entry to the extended NTZ at 616, adjust the transmission parameters at 618, and transmit the limited power UL transmission 620.

Figure 9:
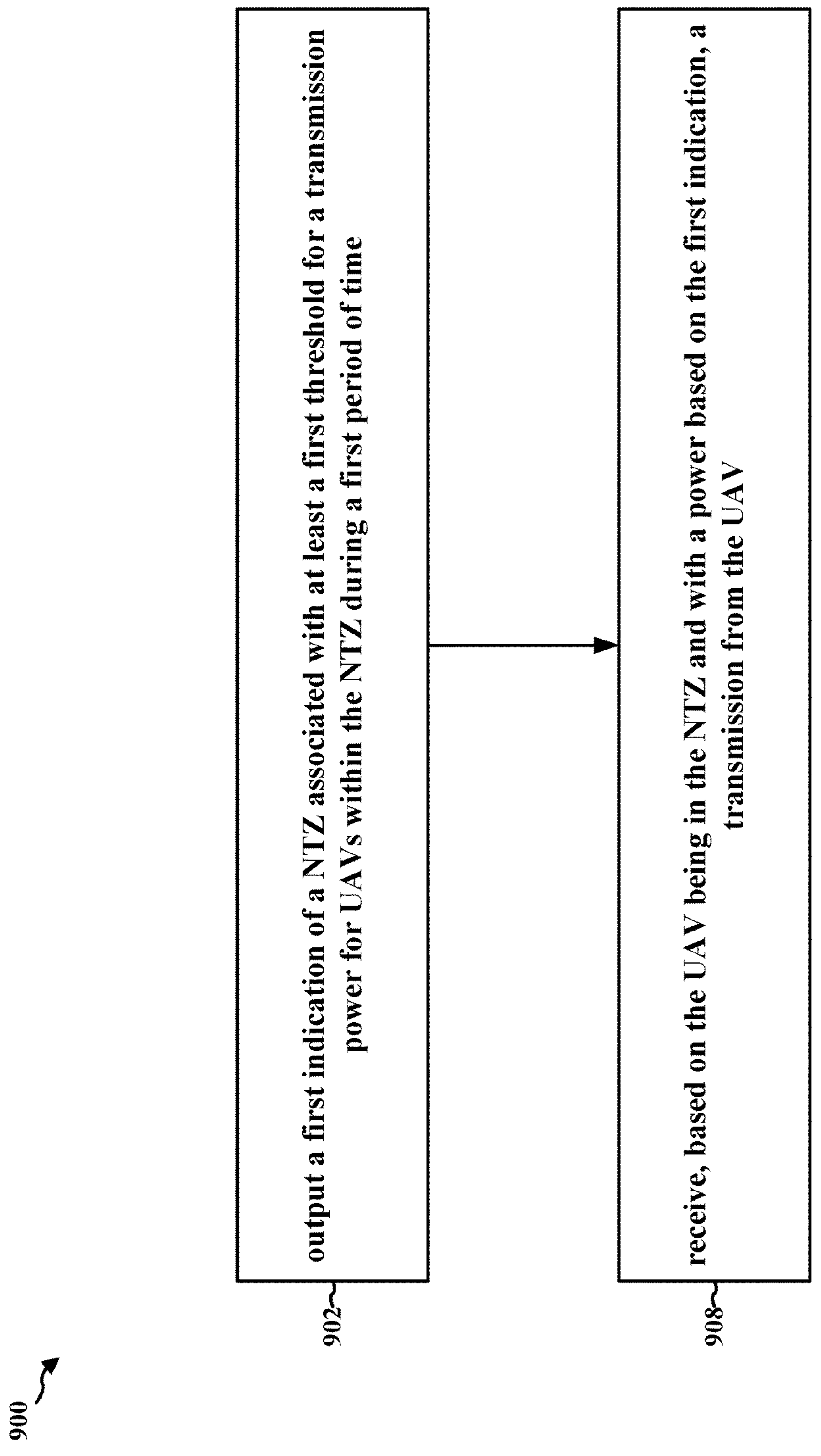
FIG. 9 is a flowchart of a method of wireless communication.

FIG. 9 is a flowchart 900 of a method of wireless communication. The method may be performed by a network device such as a base station (e.g., the base station 102 402, 502A, 502B, 602; the network entity 1102, 1202, 1360). At 902, the base station may output a first indication of an NTZ associated with at least a first threshold for a transmission power for UAVs within the NTZ during a first period of time. For example, 902 may be performed by CU processor(s) 1212, DU processor(s) 1232, RU processor(s) 1242, transceiver(s) 1246, antenna(s) 1280, network processor 1312, network interface 1380, and/or NTZ indication component 199 of FIGS. 12 and 13. In some aspects, the transmission power is an EIRP. The first threshold, in some aspects, may be associated with one of a maximum EIRP or an average EIRP. In some aspects, the first threshold may be associated with a first frequency range. The first indication, in some aspects, may indicate that the NTZ is a first class of NTZ associated with the first threshold. The first indication of the NTZ, in some aspects, may also indicate the time period associated with the first threshold. In some aspects, for example, the first indication may indicate a start and end time, a start time and duration, or a start time with an end to be indicated at a later time (e.g., indicated dynamically by another NTZ configuration indication) for an application of the first threshold. For example, referring to FIG. 6, the base station 602 may transmit the NTZ configuration 610 (or the additional NTZ configuration 615) including the first indication of the NTZ.

In some aspects, the base station may output a second indication of an area associated with and extending beyond the NTZ (e.g., an extended NTZ). In some aspects, at least a portion of the area that extends beyond the NTZ may be associated with a second threshold for the transmission power for the UAVs within the area during the first period of time. The second threshold, in some aspects, may be higher than the first threshold. The area associated with and extending beyond the NTZ, in some aspects, may be associated with a transmission of a proximity indication indicating that the UAV has entered the area associated with the NTZ. For example, referring to FIG. 6, the base station 602 may receive the NTZ configuration 610 including the second indication of the area associated with and extending beyond the NTZ.

In some aspects, the base station may receive, based on a UAV entering the area (e.g., the extended NTZ), a proximity indication indicating that the UAV has entered the area associated with the NTZ. In some aspects, if the first indication of the NTZ was not received at 902, the UAV may receive the first indication of the NTZ based on transmitting the proximity indication. For example, referring to FIG. 6, the base station 602 may transmit the proximity indication 614 and may receive the additional NTZ configuration 615 including the first indication of the NTZ.

At 908, the base station may receive, based on the UAV being in the NTZ and with a power based on the first indication, a transmission from the UAV. In some aspects, receiving the transmission from the UAV at 908 may include receiving the transmission via a second frequency range that is disjoint from the first frequency range. For example, 908 may be performed by CU processor(s) 1212, DU processor(s) 1232, RU processor(s) 1242, transceiver(s) 1246, antenna(s) 1280, network processor 1312, network interface 1380, and/or NTZ indication component 199 of FIGS. 12 and 13. Referring, for example, to FIG. 6, the base station 602 may receive the limited power UL transmission 620.

Figure 10:
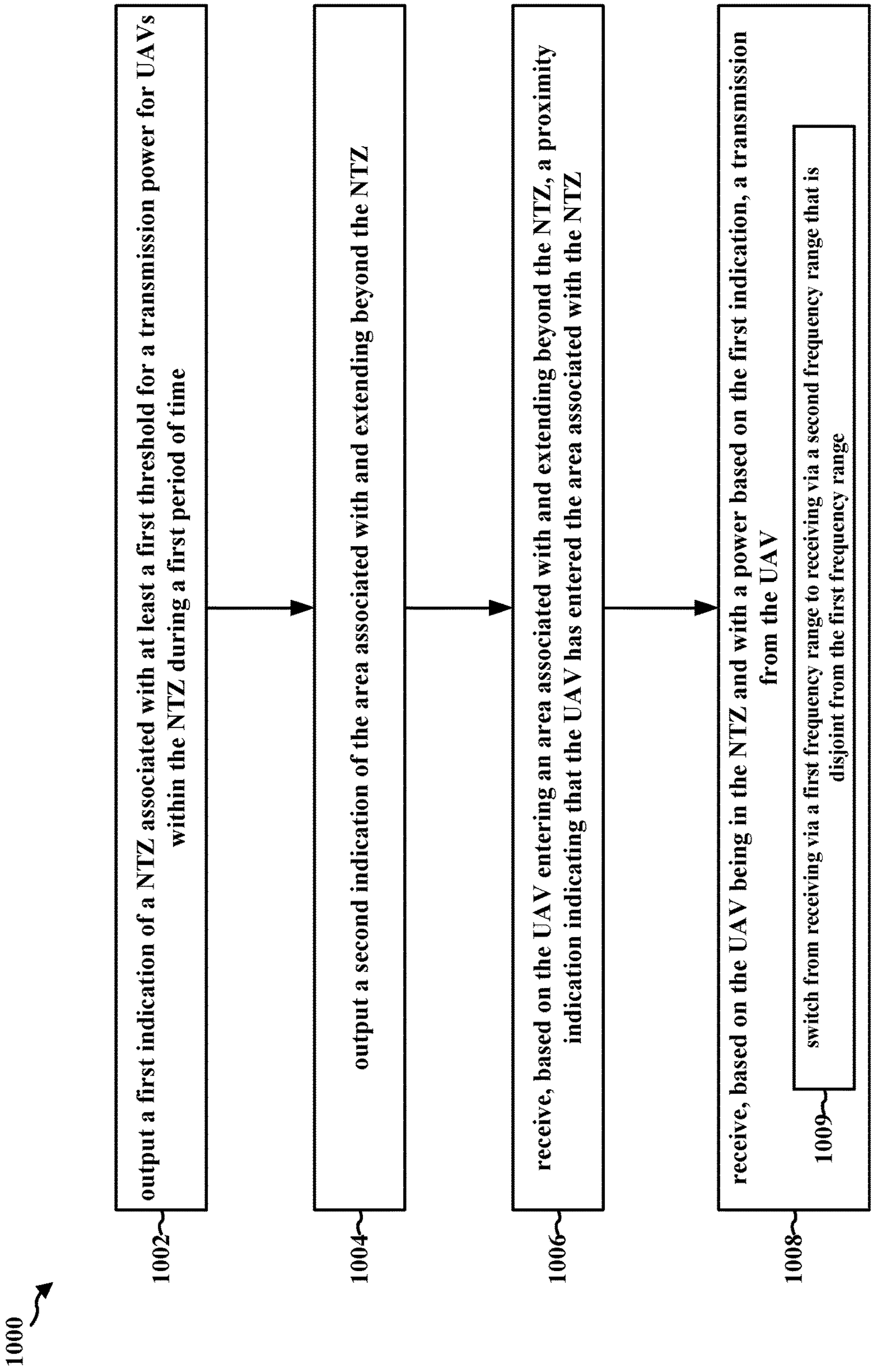
FIG. 10 is a flowchart of a method of wireless communication.

FIG. 10 is a flowchart 1000 of a method of wireless communication. The method may be performed by a network device such as a base station (e.g., the base station 102 402, 502A, 502B, 602; the network entity 1102, 1202, 1360). At 1002, the base station may output a first indication of an NTZ associated with at least a first threshold for a transmission power for UAVs within the NTZ during a first period of time. For example, 1002 may be performed by CU processor(s) 1212, DU processor(s) 1232, RU processor(s) 1242, transceiver(s) 1246, antenna(s) 1280, network processor 1312, network interface 1380, and/or NTZ indication component 199 of FIGS. 12 and 13. In some aspects, the transmission power is an EIRP. The first threshold, in some aspects, may be associated with one of a maximum EIRP or an average EIRP. In some aspects, the first threshold may be associated with a first frequency range. The first indication, in some aspects, may indicate that the NTZ is a first class of NTZ associated with the first threshold. The first indication of the NTZ, in some aspects, may also indicate the time period associated with the first threshold. In some aspects, for example, the first indication may indicate a start and end time, a start time and duration, or a start time with an end to be indicated at a later time (e.g., indicated dynamically by another NTZ configuration indication) for an application of the first threshold. For example, referring to FIG. 6, the base station 602 may transmit the NTZ configuration 610 (or the additional NTZ configuration 615) including the first indication of the NTZ.

At 1004, the base station may output a second indication of an area associated with and extending beyond the NTZ (e.g., an extended NTZ). For example, 1004 may be performed by CU processor(s) 1212, DU processor(s) 1232, RU processor(s) 1242, transceiver(s) 1246, antenna(s) 1280, network processor 1312, network interface 1380, and/or NTZ indication component 199 of FIGS. 12 and 13. In some aspects, at least a portion of the area that extends beyond the NTZ may be associated with a second threshold for the transmission power for the UAVs within the area during the first period of time. The second threshold, in some aspects, may be higher than the first threshold. The area associated with and extending beyond the NTZ, in some aspects, may be associated with a transmission of a proximity indication indicating that the UAV has entered the area associated with the NTZ. For example, referring to FIG. 6, the base station 602 may receive the NTZ configuration 610 including the second indication of the area associated with and extending beyond the NTZ.

At 1006, the base station may receive, based on a UAV entering the area, a proximity indication indicating that the UAV has entered the area associated with the NTZ. For example, 1006 may be performed by CU processor(s) 1212, DU processor(s) 1232, RU processor(s) 1242, transceiver(s) 1246, antenna(s) 1280, network processor 1312, network interface 1380, and/or NTZ indication component 199 of FIGS. 12 and 13. In some aspects, if the first indication of the NTZ was not received at 1002, the UAV may receive the first indication of the NTZ based on transmitting the proximity indication. For example, referring to FIG. 6, the base station 602 may transmit the proximity indication 614 and may receive the additional NTZ configuration 615 including the first indication of the NTZ.

At 1008, the base station may receive, based on the UAV being in the NTZ and with a power based on the first indication, a transmission from the UAV. In some aspects, receiving the transmission from the UAV at 1008 may include receiving, at 1009, the transmission via a second frequency range that is disjoint from the first frequency range. For example, 1008 and 1009 may be performed by CU processor(s) 1212, DU processor(s) 1232, RU processor(s) 1242, transceiver(s) 1246, antenna(s) 1280, network processor 1312, network interface 1380, and/or NTZ indication component 199 of FIGS. 12 and 13. Referring, for example, to FIG. 6, the base station 602 may receive the limited power UL transmission 620.

Figure 11:
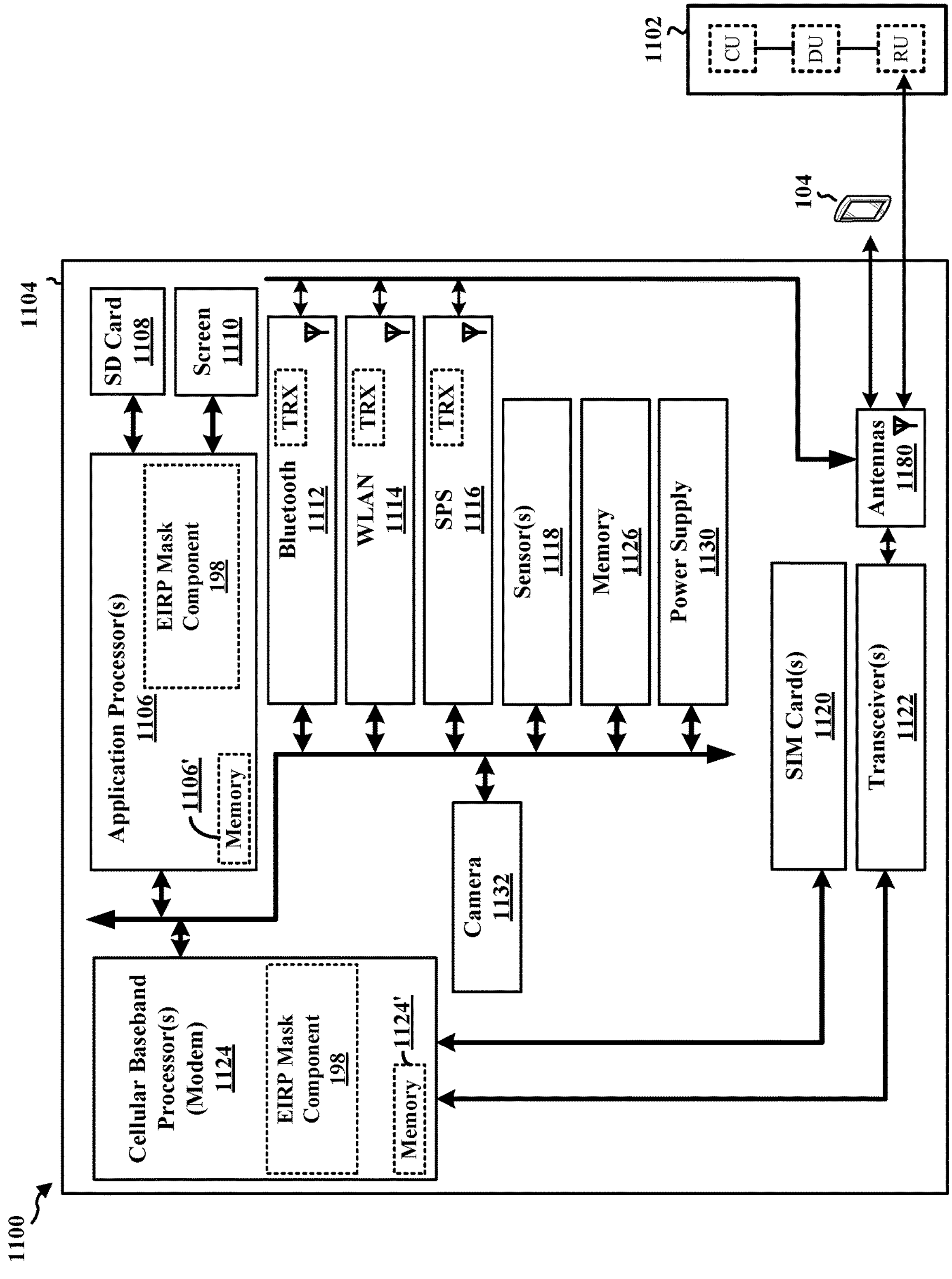
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE or UAV, a component of a UE or UAV, or may implement UE functionality. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize one or more antennas 1180 for communication. The cellular baseband processor(s) 1124 communicates through the transceiver(s) 1122 via the one or more antennas 1180 with the UE 104 and/or with an RU associated with a network entity 1102. The cellular baseband processor(s) 1124 and the application processor(s) 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The computer-readable medium/memory may also be used for storing data that is manipulated by the cellular baseband processor(s) 1124/application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the EIRP mask component 198 may be configured to receive a first indication of an NTZ associated with at least a first threshold for a transmission power for UAVs within the NTZ during a first period of time, enter the NTZ, and limit, within the NTZ, the transmission power associated with a transmission from the UAV to meet the first threshold. The EIRP mask component 198 may be within the cellular baseband processor(s) 1124, the application processor(s) 1106, or both the cellular baseband processor(s) 1124 and the application processor(s) 1106. The EIRP mask component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for receiving a first indication of an NTZ associated with at least a first threshold for a transmission power for UAVs within the NTZ during a first period of time. The apparatus 1104, and in particular the cellular baseband processor(s) 1124 and/or the application processor(s) 1106, may include means for entering the NTZ. The apparatus 1104, and in particular the cellular baseband processor(s) 1124 and/or the application processor(s) 1106, may include means for limiting, within the NTZ, the transmission power associated with a transmission from the UAV to meet the first threshold. The apparatus 1104, and in particular the cellular baseband processor(s) 1124 and/or the application processor(s) 1106, may include means for entering an area associated with and extending beyond the NTZ. The apparatus 1104, and in particular the cellular baseband processor(s) 1124 and/or the application processor(s) 1106, may include means for transmitting, based on entering the area, a proximity indication indicating that the UAV has entered the area associated with the NTZ. The apparatus 1104, and in particular the cellular baseband processor(s) 1124 and/or the application processor(s) 1106, may include means for receiving a second indication of the area associated with and extending beyond the NTZ. The apparatus 1104, and in particular the cellular baseband processor(s) 1124 and/or the application processor(s) 1106, may include means for switching from transmitting via the first frequency range to transmitting via a second frequency range that is disjoint from the first frequency range. The apparatus 1104 may further include means for performing any of the aspects described in connection with the flowcharts in FIG. 7 or 8, and/or performed by the UAV in the communication flow of FIG. 6. The means may be the EIRP mask component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 7 and 8.

Figure 12:
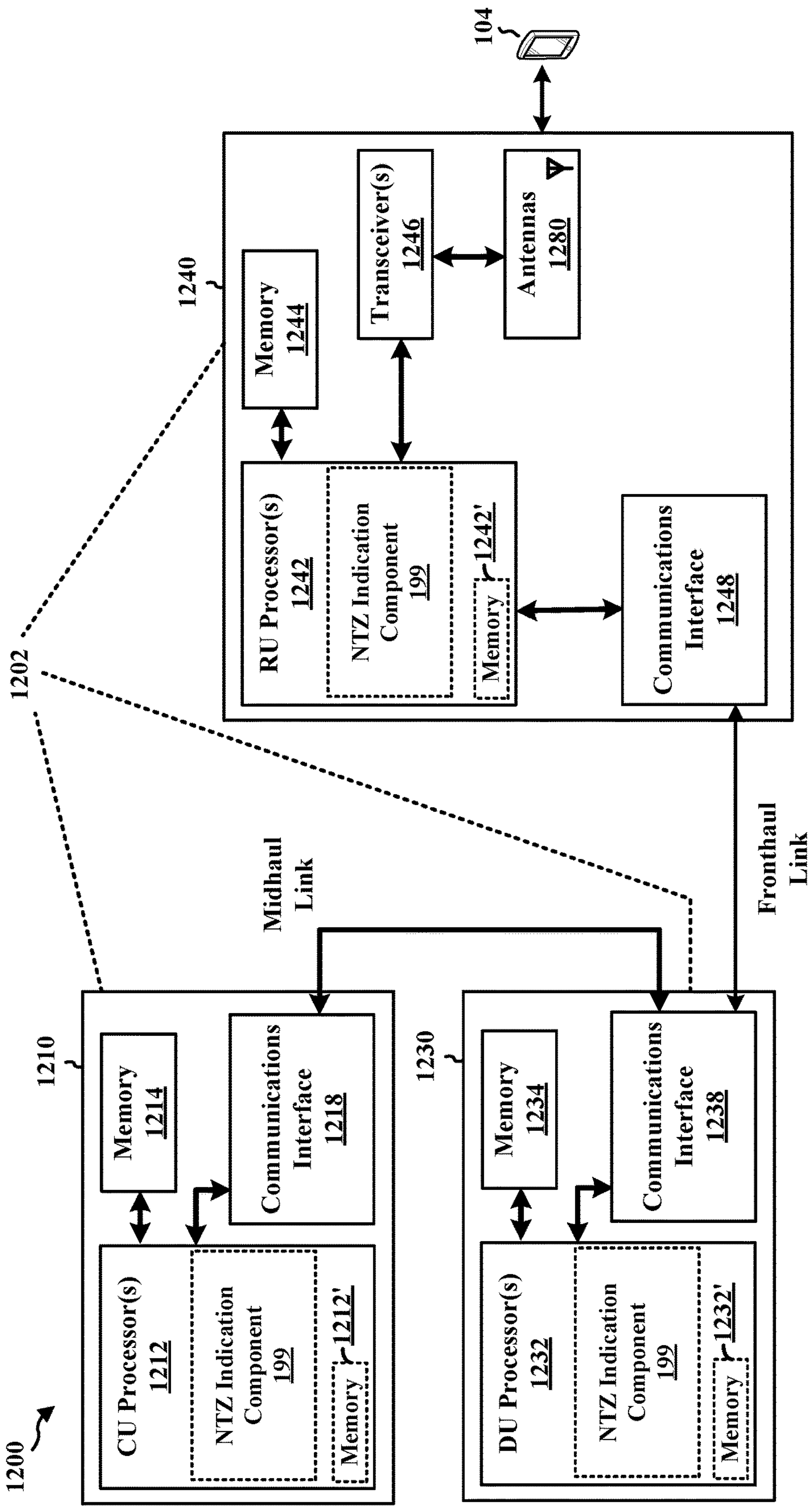
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the NTZ indication component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, one or more antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NTZ indication component 199 may be configured to output a first indication of an NTZ associated with at least a first threshold for a transmission power for UAVs within the NTZ during a first period of time and receive, based on the UAV being in the NTZ and with a power based on the first indication, a transmission from the UAV. The NTZ indication component 199 may be within one or more processors of one or more of the CU 1210, DU 1230, and the RU 1240. The NTZ indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for outputting a first indication of an NTZ associated with at least a first threshold for a transmission power for UAVs within the NTZ during a first period of time. The network entity 1202 may include means for receiving, based on the UAV being in the NTZ and with a power based on the first indication, a transmission from the UAV. The network entity 1202 may include means for receiving, based on the UAV entering an area associated with and extending beyond the NTZ, a proximity indication indicating that the UAV has entered the area associated with the NTZ. The network entity 1202 may include means for outputting a second indication of the area associated with and extending beyond the NTZ. The network entity 1202 may include means for receiving the transmission via a second frequency range that is disjoint from the first frequency range. The network entity 1202 may further include means for performing any of the aspects described in connection with the flowcharts in FIG. 9 or 10, and/or performed by the base station in the communication flow of FIG. 6. The means may be the NTZ indication component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 9 and 10.

Figure 13:
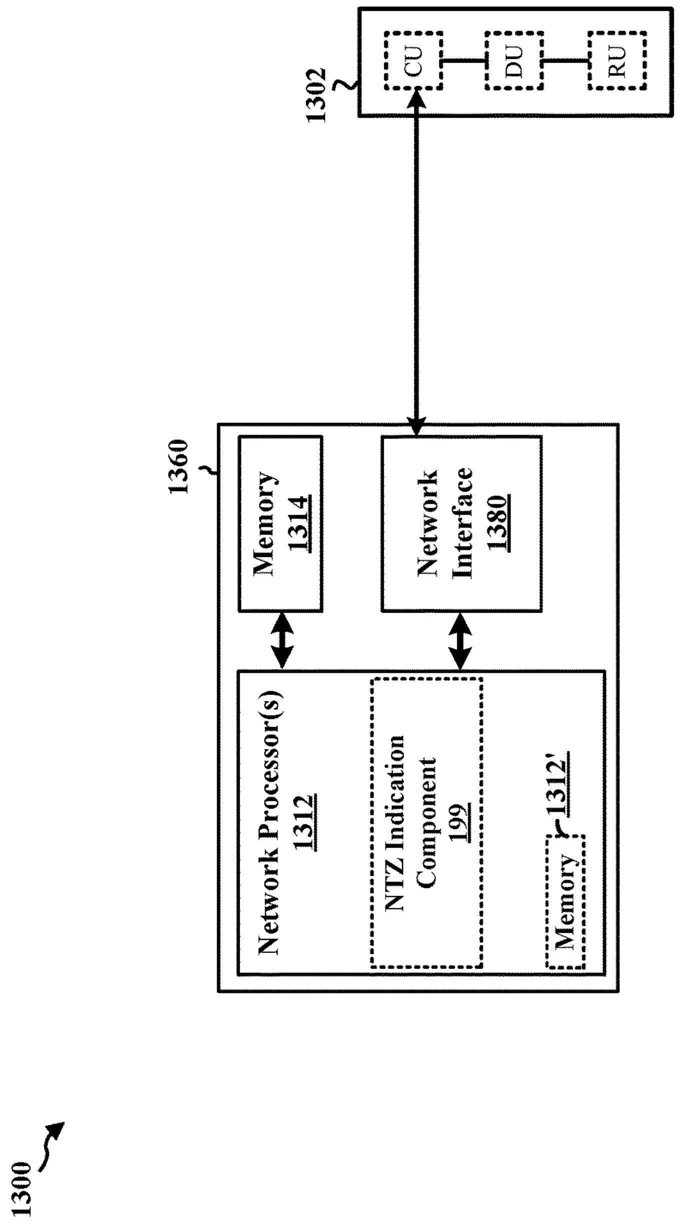
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include at least one network processor 1312. The network processor(s) 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The network processor(s) 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NTZ indication component 199 may be configured to output a first indication of an NTZ associated with at least a first threshold for a transmission power for UAVs within the NTZ during a first period of time and receive, based on the UAV being in the NTZ and with a power based on the first indication, a transmission from the UAV. The NTZ indication component 199 may be within the network processor(s) 1312. The NTZ indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1360 may include a variety of components configured for various functions. In one configuration, the network entity 1360 may include means for outputting a first indication of an NTZ associated with at least a first threshold for a transmission power for UAVs within the NTZ during a first period of time. The network entity 1360 may include means for receiving, based on the UAV being in the NTZ and with a power based on the first indication, a transmission from the UAV. The network entity 1360 may include means for receiving, based on the UAV entering an area associated with and extending beyond the NTZ, a proximity indication indicating that the UAV has entered the area associated with the NTZ. The network entity 1360 may include means for outputting a second indication of the area associated with and extending beyond the NTZ. The network entity 1360 may include means for receiving the transmission via a second frequency range that is disjoint from the first frequency range. The network entity 1202 may further include means for performing any of the aspects described in connection with the flowcharts in FIG. 9 or 10, and/or performed by the base station in the communication flow of FIG. 6. The means may be the NTZ indication component 199 of the network entity 1360 configured to perform the functions recited by the means or as described in relation to FIGS. 9 and 10.

Various aspects relate generally to meeting regulatory requirements applied to UAVs. For example, a UAV may not be allowed to transmit signals with power higher than a specified power (e.g., EIRP over a specific angle) in a particular band if the UAV is within an NTZ. In a situation where a UAV is in the vicinity of the NTZ, the UAV may need to provide an indication to the serving gNB that it is in an area where the current serving band needs to be switched to another band. Some aspects more specifically relate to (1) the introduction of an "additional area of uncertainty" around the NTZ such that, when a UAV enters the additional area of uncertainty, the UAV provides an indication to a base station and/or network that the UAV is in the vicinity of the NTZ and (2) an indication of a switch in UL transmissions to another band to avoid transmissions in the NTZ in the regulated and/or restricted frequency range. In some examples, a UAV and/or drone may be configured to receive a first indication of an NTZ associated with at least a first threshold for a transmission power for UAVs within the NTZ during a first period of time, enter the NTZ, and limit, within the NTZ, the transmission power associated with a transmission from the UAV to meet the first threshold. Similarly, a network device may be configured to output a first indication of an NTZ associated with at least a first threshold for a transmission power for UAVs within the NTZ during a first period of time and receive, based on the UAV being in the NTZ and with a power based on the first indication, a transmission from the UAV.

Particular aspects of the subject matter described in this disclosure can be implemented to realize one or more of the following potential advantages. In some examples, by introducing an EIRP mask for transmissions within an NTZ, the described techniques can be used to allow UAV-related communication while minimizing interference with network elements protected by the NTZ.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at an unmanned aerial vehicle (UAV), comprising: receiving a first indication of a no-transmit zone (NTZ) associated with at least a first threshold for a transmission power for UAVs within the NTZ during a first period of time; entering the NTZ; and limiting, within the NTZ, the transmission power associated with a transmission from the UAV to meet the first threshold.

Aspect 2 is the method of aspect 1, wherein the transmission power is an effective isotropic radiated power (EIRP).

Aspect 3 is the method of aspect 2, wherein the first threshold is associated with one of a maximum EIRP or an average EIRP.

Aspect 4 is the method of any of aspects 1 to 3, further comprising: entering an area associated with and extending beyond the NTZ; and transmitting, based on entering the area, a proximity indication indicating that the UAV has entered the area associated with the NTZ.

Aspect 5 is the method of aspect 4, further comprising: receiving a second indication of the area associated with and extending beyond the NTZ.

Aspect 6 is the method of aspect 5, wherein at least a portion of the area that extends beyond the NTZ is associated with a second threshold for the transmission power for the UAVs within the area during the first period of time, wherein the second threshold is higher than the first threshold.

Aspect 7 is the method of any of aspects 5 and 6, wherein receiving the first indication is based on transmitting the proximity indication.

Aspect 8 is the method of any of aspects 1 to 7, wherein the first threshold is associated with a first frequency range, and limiting, within the NTZ, the transmission power associated with the transmission from the UAV to meet the first threshold comprises: switching from transmitting via the first frequency range to transmitting via a second frequency range that is disjoint from the first frequency range.

Aspect 9 is the method of any of aspects 1 to 8, wherein the first indication further indicates that the NTZ is also associated with at least a second threshold for the transmission power for the UAVs within the NTZ during a second period of time.

Aspect 10 is the method of any of aspects 1 to 9, wherein the first indication indicates that the NTZ is a first class of NTZ associated with the first threshold.

Aspect 11 is a method of wireless communication at a network device associated with an unmanned aerial vehicle (UAV), comprising: outputting a first indication of a no-transmit zone (NTZ) associated with at least a first threshold for a transmission power for UAVs within the NTZ during a first period of time; and receiving, based on the UAV being in the NTZ and with a power based on the first indication, a transmission from the UAV.

Aspect 12 is the method of aspect 11, wherein the transmission power is an effective isotropic radiated power (EIRP).

Aspect 13 is the method of aspect 12, wherein the first threshold is associated with one of a maximum EIRP or an average EIRP.

Aspect 14 is the method of any of aspects 11 to 13, further comprising: receiving, based on the UAV entering an area associated with and extending beyond the NTZ, a proximity indication indicating that the UAV has entered the area associated with the NTZ.

Aspect 15 is the method of aspect 14, further comprising: outputting a second indication of the area associated with and extending beyond the NTZ.

Aspect 16 is the method of aspect 15, wherein the area associated with and extending beyond the NTZ is associated with a second threshold for the transmission power for the UAVs within the area during the first period of time, wherein the second threshold is higher than the first threshold.

Aspect 17 is the method of any of aspects 15 and 16, wherein outputting the first indication is based on receiving the proximity indication.

Aspect 18 is the method of any of aspects 11 to 17, wherein the first threshold is associated with a first frequency range, and receiving the transmission from the UAV comprises receiving the transmission via a second frequency range that is disjoint from the first frequency range.

Aspect 19 is the method of any of aspects 11 to 18, wherein the first indication further indicates that the NTZ is also associated with at least a second threshold for the transmission power for the UAVs within the NTZ during a second period of time.

Aspect 20 is the method of any of aspects 11 to 19, wherein the first indication indicates that the NTZ is a first class of NTZ associated with the first threshold.

Aspect 21 is an apparatus for wireless communication at a device including a memory and at least one processor coupled to the memory and, based at least in part on information stored in the memory, the at least one processor is configured to implement any of aspects 1 to 10.

Aspect 22 is the apparatus of aspect 21, further including a transceiver or an antenna coupled to the at least one processor.

Aspect 23 is an apparatus for wireless communication at a device including means for implementing any of aspects 1 to 10.

Aspect 24 is a computer-readable medium (e.g., a non-transitory computer-readable medium) storing computer executable code, where the code when executed by a processor causes the processor to implement any of aspects 1 to 10.

Aspect 25 is an apparatus for wireless communication at a device including a memory and at least one processor coupled to the memory and, based at least in part on information stored in the memory, the at least one processor is configured to implement any of aspects 11 to 20.

Aspect 26 is the apparatus of aspect 25, further including a transceiver or an antenna coupled to the at least one processor.

Aspect 27 is an apparatus for wireless communication at a device including means for implementing any of aspects 11 to 20.

Aspect 28 is a computer-readable medium (e.g., a non-transitory computer-readable medium) storing computer executable code, where the code when executed by a processor causes the processor to implement any of aspects 11 to 20.

What is claimed is:

1. An apparatus for wireless communication at an unmanned aerial vehicle (UAV), comprising:

at least one memory; and at least one processor coupled to the at least one memory and, based at least in part on stored information that is stored in the at least one memory, the at least one processor is configured to:

receive a first indication of a no-transmit zone (NTZ) associated with at least a first threshold for a transmission power for UAVs within the NTZ during a first period of time;

enter the NTZ; and limit, within the NTZ, the transmission power associated with a transmission from the UAV to meet the first threshold.

2. The apparatus of claim 1, wherein the transmission power is an effective isotropic radiated power (EIRP).

3. The apparatus of claim 2, wherein the first threshold is associated with one of a maximum EIRP or an average EIRP.

4. The apparatus of claim 1, wherein the at least one processor is further configured to:

enter an area associated with and extending beyond the NTZ; and transmit, based on entering the area, a proximity indication indicating that the UAV has entered the area associated with the NTZ.

5. The apparatus of claim 4, wherein the at least one processor is further configured to:

receive a second indication of the area associated with and extending beyond the NTZ.

6. The apparatus of claim 5, wherein at least a portion of the area that extends beyond the NTZ is associated with a second threshold for the transmission power for the UAVs within the area during the first period of time, wherein the second threshold is higher than the first threshold.

7. The apparatus of claim 5, wherein the at least one processor is configured to receive the first indication based on transmitting the proximity indication.

8. The apparatus of claim 1, wherein the first threshold is associated with a first frequency range, and to limit, within the NTZ, the transmission power associated with the transmission from the UAV to meet the first threshold, the at least one processor is configured to:

switch from transmitting via the first frequency range to transmitting via a second frequency range that is disjoint from the first frequency range.

9. The apparatus of claim 1, wherein the first indication further indicates that the NTZ is also associated with at least a second threshold for the transmission power for the UAVs within the NTZ during a second period of time.

10. The apparatus of claim 1, wherein the first indication indicates that the NTZ is a first class of NTZ associated with the first threshold.

11. An apparatus for wireless communication at a network device associated with an unmanned aerial vehicle (UAV), comprising:

at least one memory; and at least one processor coupled to the at least one memory and, based at least in part on stored information that is stored in the at least one memory, the at least one processor is configured to:

output a first indication of a no-transmit zone (NTZ) associated with at least a first threshold for a transmission power for UAVs within the NTZ during a first period of time; and receive, based on the UAV being in the NTZ and with a power based on the first indication, a transmission from the UAV.

12. The apparatus of claim 11, wherein the transmission power is an effective isotropic radiated power (EIRP).

13. The apparatus of claim 12, wherein the first threshold is associated with one of a maximum EIRP or an average EIRP.

14. The apparatus of claim 11, wherein the at least one processor is further configured to:

output a second indication of an area associated with and extending beyond the NTZ; and receive, based on the UAV entering the area associated with and extending beyond the NTZ, a proximity indication indicating that the UAV has entered the area associated with the NTZ.

15. The apparatus of claim 14, wherein the area associated with and extending beyond the NTZ is associated with a second threshold for the transmission power for the UAVs within the area during the first period of time, wherein the second threshold is higher than the first threshold.

16. The apparatus of claim 14, wherein the at least one processor is configured to output the first indication based on receiving the proximity indication.

17. The apparatus of claim 11, wherein the first threshold is associated with a first frequency range, and to receive the transmission from the UAV the at least one processor is configured to receive the transmission via a second frequency range that is disjoint from the first frequency range.

18. The apparatus of claim 11, wherein the first indication further indicates that the NTZ is also associated with at least a second threshold for the transmission power for the UAVs within the NTZ during a second period of time.

19. The apparatus of claim 11, wherein the first indication indicates that the NTZ is a first class of NTZ associated with the first threshold.

20. A method of wireless communication at an unmanned aerial vehicle (UAV), comprising:

receiving a first indication of a no-transmit zone (NTZ) associated with at least a first threshold for a transmission power for UAVs within the NTZ during a first period of time;

entering the NTZ; and limiting, within the NTZ, the transmission power associated with a transmission from the UAV to meet the first threshold.

* * * * *